United States Patent [19]

Uno et al.

[11] 4,099,188

[45] Jul. 4, 1978

[54] AUTOMATIC EXPOSURE CONTROL DEVICE FOR SINGLE LENS REFLEX CAMERA

[75] Inventors: Naoyuki Uno, Urawa; Tetsuji Shono, Ranzan-machi Shiga; Fumio Urano, Omiya; Masahiro Kawasaki, Tokyo, all of Japan

[73] Assignee: Asahi Kogaku Kogyo Kabushiki Kaisha, Tokyo, Japan

[21] Appl. No.: 721,637

[22] Filed: Sep. 8, 1976

Related U.S. Application Data

[63] Continuation of Ser. No. 619,163, Oct. 3, 1975, abandoned, and Ser. No. 626,895, Oct. 29, 1975, abandoned.

[30] Foreign Application Priority Data

Oct. 29, 1974 [JP] Japan ........................... 49-130666[U]

Oct. 9, 1974 [JP] Japan ........................... 49-122493[U]

[51] Int. Cl.[2] ................................................ G03B 7/08

[52] U.S. Cl. ........................................ 354/24; 354/41; 354/43; 354/271

[58] Field of Search ....................... 354/24, 29, 30, 38, 354/42, 43, 45, 60 R, 270, 271, 272

[56] References Cited

U.S. PATENT DOCUMENTS

| | | | |
|---|---|---|---|
| 3,670,637 | 6/1972 | Mori et al. | 354/60 R X |
| 3,808,463 | 4/1974 | Mullder | 354/43 X |
| 3,829,867 | 8/1974 | Ono | 354/28 |
| 3,863,263 | 1/1975 | Itagaki | 354/24 |
| 3,864,700 | 2/1975 | Mielke | 354/43 |
| 3,883,882 | 5/1975 | Mori | 354/51 |
| 3,893,134 | 7/1975 | Brauning | 354/30 |
| 3,903,529 | 9/1975 | Sorimachi et al. | 354/38 |
| 3,936,843 | 2/1976 | Kurei et al. | 354/51 |

FOREIGN PATENT DOCUMENTS

| | | | |
|---|---|---|---|
| 1,114,460 | 5/1968 | United Kingdom | 354/43 |

*Primary Examiner*—Richard A. Wintercorn
*Assistant Examiner*—M. L. Gellner
*Attorney, Agent, or Firm*—Sughrue, Rothwell, Mion, Zinn and Macpeak

[57] ABSTRACT

An automatic exposure control device for a single lens reflex camera characterized in that a stop determining member which stops down diaphragm blades by rotation thereof at a predetermined speed is released by a shutter release plate. A time constant circuit is started to operate simultaneously with the start of rotation of said stop determining member, and the rotation of said stop determining member is stopped by an electromagnetic mechanism when a time has lapsed. The length of said time linearly corresponds to the stop size determined by APEX operation based on the output voltage of said time constant circuit as an operation factor.

6 Claims, 4 Drawing Figures

FIG. 1
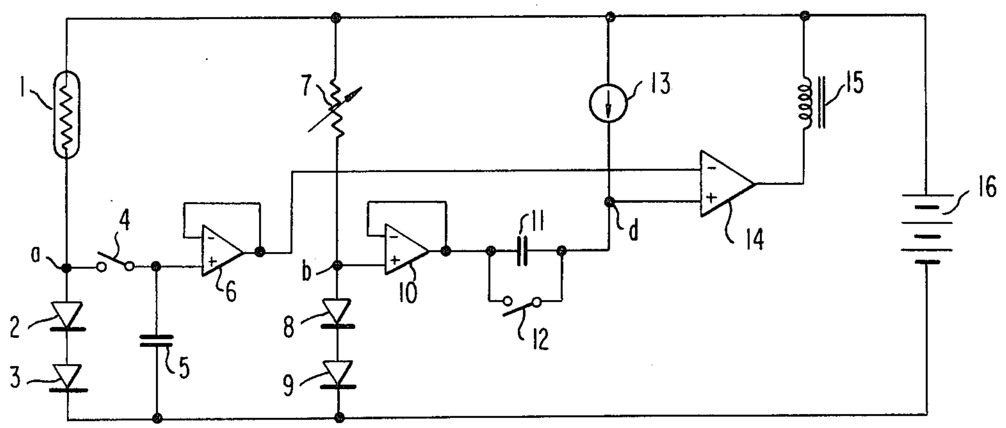
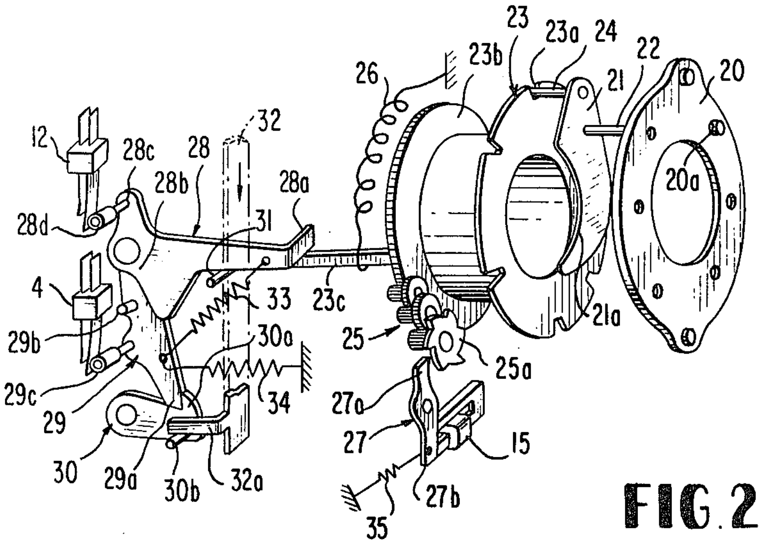
FIG. 2

AUTOMATIC EXPOSURE CONTROL DEVICE FOR SINGLE LENS REFLEX CAMERA

RELATED APPLICATIONS

This application is a continuation of applications Ser. No. 619,163 filed Oct. 3, 1975 and Ser. No. 626,895 filed Oct. 29, 1975, both now abandoned in favor of this application.

BACKGROUND OF THE INVENTION

This invention relates to an automatic exposure control device of the stop-predetermined type for a single lens reflex camera wherein information concerning the scene brightness is memorized and the stop is controlled automatically by an electromagnetic mechanism.

Heretofore, it has been known in the art to automatically control the stop size of a camera, in accordance with the scene brightness, by a meter clamping method. However, the use of a meter is disadvantageous because of its lack of strength and reliability. Further, since the meter is also used as an exposure meter, it is inconvenient to use the meter in combination with other elements. Also the exposure meter occupies a large space. On the other hand, a balancing method which employs a servo-motor is disadvantageous in that the motor requires excessive power and is too large to be conveniently built into a camera body without enlarging the camera body size.

Where the shutter-preferential system is employed to control the iris opening, time is the output. In APEX operation, if the brightness value (Bv) varies in three steps, the time (Tv) also varies in three steps but must be a value proportional to $2^3$.

More specifically, if time is exponentially related to the brightness value and, for example, in lenses having *f* stops from 1.4 to 22 in eight steps, it would take 1 ms to stop down to *f*2 and $1 \times 2^8 = 256$ ms to stop down to *f*22. As is known, in single lens reflex cameras the amount of light must be adjusted before the shutter is actuated. Accordingly, if it takes an excessively long period of time for such automatic adjustment, one would not only miss an opportunity for correctly timed shutter operation but the stability of photography operation itself would be impaired. For these reasons, it has not been suitable to use aperture time control with the shutter-preferential system.

SUMMARY OF THE INVENTION

According to the present invention, an electromagnet is used instead of the meter or motor as an electrical-to-mechanical transducer, and the stop is controlled after a specific length of time, the length of which linearly corresponds to the stop size, APEX-operated, based on the scene brightness, shutter speed and film sensitivity.

In one embodiment of the invention applied to a single lens reflex camera, the scene brightness is memorized before any movement of the mirror and the stop. However, memorization of the scene brightness requires a storage capacitor. Such elements are usually accompanied by certain disadvantages, such as charge leakage or degradation of humidity resistance. Therefore, in accordance with an improvement on the basic invention, the stop determining system does not use a capacitor for storing a charge dependent upon brightness.

In order to control the exposure by a stop without memorizing the scene brightness, the stop determining member is operated before the mirror and the stop blades move. However, since the time from the start of the stop determining member to the cessation of movement of the stop blades results in a delay in the camera operation, the present invention is characterized in the following features in order to reduce the delay as much as possible:

(1) The termination of movement of the stop determining member and the start movement of stop blades are conducted substantially at the same time.

(2) The stop size AV, determined by APEX, is made to have a linear relationship with the time for determining the stop size of the stop determining member.

BRIEF DESCRIPTION OF THE DRAWINGS

FIG. 1 is a schematic diagram of the electric circuit of the device in accordance with the present invention.

FIG. 2 is a view showing a mechanism of the device in accordance with the present invention.

DETAILED DESCRIPTION OF THE DRAWINGS

Figure 3:
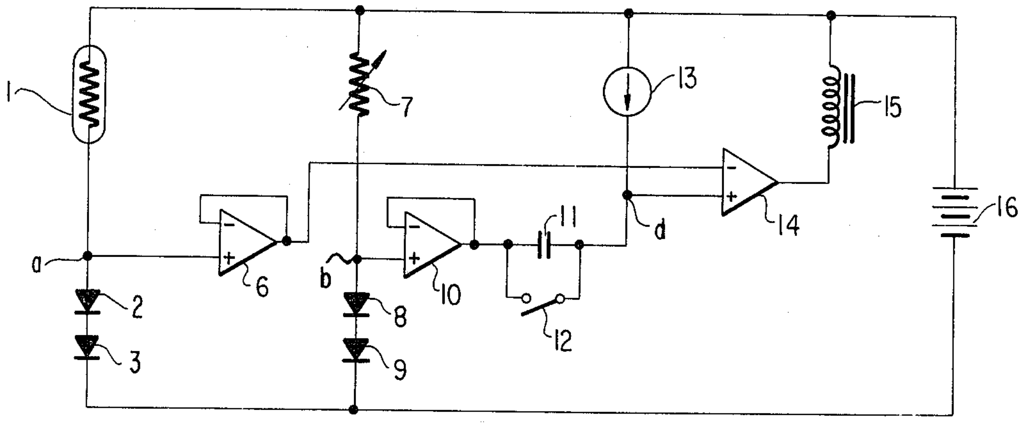
FIG. 3 is a schematic diagram of an improvement of the electric circuit shown in FIG. 1 which eliminates the capacitor for storing a charge dependent upon brightness.

If the shutter speed of an automatic exposure control system is predetermined in advance of controlling the stopping down of the aperture, then the controlling time for stop blade movement appears as an output of the electronic circuit. As previously mentioned, in the APEX operation, when the scene brightness (Bv) changes by three steps, the time (Tv) also changes by three steps and accordingly, the time must be changed to $2^3$ times as long as the time before changed. Concretely explaining the above, if the time is exponentially related to the scene brightness, then the relationship of the control time to the steps of the stop mechanism is as follows. Assume a camera with eight steps of a stop mechanism, e.g., from *f*1.4 to *f*22. If the time for control at the first step is 1 ms, then the time for controlling the stop eight steps is 256 ms ($1 \times 2^8 = 256$). In contrast to this, the present invention makes the time for controlling the stop have a linear relationship with the scene brightness (Bv). In this case, if the control time for 1 step of Bv is set to at 1 ms, then the smallest stop size (i.e., stopping down eight steps) can be obtained in $1 \times 8 = 8$ ms.

In FIG. 1, a photodetector 1 and log-compression diodes 2 and 3 are connected in series with a power source 16, and the node *a* between the photodetector 1 and the diodes 2 and 3 is connected to a storage capacitor 5 and an operational amplifier 6 having a high input impedance through a memory switch 4. The operational amplifier 6 is constructed as an ordinary voltage follower.

A variable resistor 7 and log-compression diodes 8 and 9 are connected in series with the power source 16, and the node *b* between the variable resistor 7 and the diodes 8 and 9 is connected to an operational amplifier 10 having a high input impedance. The operational amplifier 10 is also constructed as a voltage follower.

An integrating capacitor 11 has a reset switch 12 connected in parallel therewith. One end of the capacitor 11 is connected with the power source 16 by way of a constant current source 13, and the other end thereof is connected with an output terminal of the amplifier 10. The node *d* between the constant current source 13 and the capacitor 11 is connected with the non-inverting input terminal of an operational amplifier 14, and the output of the operational amplifier 6 is connected to the inverting input terminal of amplifier 14. The operational amplifier 14 serves as a switching circuit with the output thereof connected to a magnetic coil of an electromagnet 15 for controlling a stop mechanism of a camera.

The operation of the above circuit is as follows. Where the voltage across the photoconductive element 1 is $V_1$, and the resistance thereof is $R_1$, the current $i_1$ flowing through the log compression diodes 2 and 3 is $$i_1 = V_1/R_1 \quad (1).$$

The voltage $V'$ *of the log compression diode 2 in the normal direction thereof is*

$$V' = \frac{K \cdot T}{q} \cdot \log \frac{i_1}{i_s} + V_s \quad (2)$$

where $V_s$: terminal voltage of the log compression diode 2 when the current is $i_s$ $K$: Boltsmann's constant $T$: absolute temperature $q$: electronic charge.

If the current-to-voltage characteristic of the log compression diodes 2 and 3 (voltage, in the normal direction) is the same, the voltage $Va$ at the node $a$ is $$Va = 2 \cdot \left(\frac{K \cdot T}{q} \cdot \log \frac{i_1}{i_s} + Vs\right) \quad (3),$$

and the $Va$ becomes proportional to the scene brightness Bv indicated in terms of APEX operation.

Similarly, the current $i_2$ flowing through the log compression diodes 8 and 9 is $$i_2 = V_2/R_2 \quad (4)$$

where the terminal voltage across the variable resistor 7 is $V_2$ and the resistance thereof is $R_2$. The voltage $V_b$ at the node $b$ is, similarly to the formula (3), $$V_b = 2 \cdot \left(\frac{K \cdot T}{q} \cdot \log \frac{i_2}{i_s} + Vs\right) \quad (5).$$

The operational amplifier 14 is constituted as a switching circuit as mentioned above and operates to switch the output thereof when the non-inverting input terminal voltage becomes equal to the inverting input terminal. Where the time from the opening of switch 12 to switching of the output of amplifier 14 is $t$, the current of the constant current source 13 is $i$, the capacitance of the integrating capacitor 11 is $C_0$, and the terminal voltage of the capacitor 11 when the output of amplifier 14 is switched is $V_0$, then the following relationships apply:

$$V_o = Va - Vb = 2 \cdot \frac{K \cdot T}{q} \cdot \log \frac{i_1}{i_2} \quad (6)$$

from the formulae (3) and (5).

Further, $$i \cdot t = C_0 \cdot V_0 \quad (7)$$

and from formulae (6) and (7), $$t = \left(\frac{C_o}{i}\right) \cdot 2 \cdot \frac{K \cdot T}{q} \cdot \log \frac{i_1}{i_2} \quad (8).$$

Since from the circuit structure $V_1 \approx V_2$, from formulae (1) and (4), $$i_1/i_2 = R_2/R_1$$

and the formula (8) becomes $$t = 2\left(\frac{C_o}{i}\right) \cdot \frac{K \cdot T}{q} \cdot \log \frac{R_2}{R_1} \quad (9).$$

Now, taking that the resistance $R_1$ is the resistance of the photoconductive element 1 which varies in accordance with the scene brightness and the resistor 7 is a resistor the resistance of which is adjusted according to the shutter speed and film sensitivity, $R_1$ and $R_2$ are represented as follows.

$$R_1 = K_1 \cdot 2^{-\gamma_1 Bv} \quad (10)$$

where $K_1$: proportional coefficient $\gamma_1$: photoresistance of photoconductive element Bv: the scene brightness by the APEX system $$R_2 = K_2 \cdot 2^{-\gamma_2(Tv - Sv)} \quad (11)$$

where $K_2$: proportional coefficient $\gamma_2$: resistance ratio

Tv: shutter speed by the APEX system

Sv: film sensitivity by the APEX system.

If it is assumed that $\gamma_1 = \gamma_2 = \gamma$, from formulae (9), (10) and (11), $$t = \frac{C_o}{i} \cdot 2 \frac{K \cdot T}{q} \cdot \log \frac{R_2}{R_1} = \left(\frac{C_o}{i}\right) \cdot 2 \cdot \left(\frac{K' \cdot T}{q}\right) \left[\log \frac{K_2}{K_1} + \gamma(Bv + Sv - Tv)\right]$$

where $$K' = K/\log_2 10.$$

When $$\gamma = 0.5,$$

$$t = \left(\frac{C_o}{i}\right) \cdot \frac{K' \cdot T}{q} \left[2 \cdot \log \frac{K_2}{K_1} + (Bv + Sv - Tv)\right) \quad (12)$$

where $C_o$, $i$, $K'$, $T$, $q$ are fixed values and $K_1$ and $K_2$ are determined by measurement and adjustment, respectively.

Further, if the stop size is represented as Av by the APEX system, Av is represented as Av = Bv + Sv − Tv on the APEX operation, and accordingly, the formula (12) becomes $$t = K_3(K_0 + Av) \quad (13).$$

Since $K_0$ and $K_3$ are constants of proportionality, the formula (13) indicates that the time $t$ is in proportion to the APEX stop size $Av$. For instance, when the stop mechanism is stopped down step by step, the time is increased step by step. Therefore, in the the example of a lens of f1.4–22 (8 steps), the time for stopping down the stop by eight steps (e.g., 1.4 to 22) is 8 ms.

$K_0$ plays a role of a standard or reference level combining the time $t$ and the stop size Av. From the formulae (10) and (11), it is set by the control of $R_1$ and $R_2$ conveniently in the assembly of the mechanism.

Referring now to FIG. 2, which shows a mechanism of the device in accordance with the present invention, a support ring 20, for supporting a stop blade 21, is secured to a lens mount (not shown) and has a hole **20*a* formed therein to receive a pin 22, which serves as a rotating shaft for the stop blade 21. The stop blade 21 has another pin 24 received into a notch 23*a* in a stop opening and closing ring 23, such that when the ring 23 is rotated clockwise in FIG. 2, the stop blade is closed. The opening and closing ring 23 has a gear portion 23*b* formed at one end thereof, said gear portion being connected to a group of gears 25. Also, the gear portion 23*b* has an arm 23*c* extending toward the camera body, which terminates under the nose 28*a* of a stop swing lever 28. The stop blade 21 is set to "OPEN" until arm 23*c* contacts nose 28*a* which is held against stopper 31 by spring 33. Spring 26 biases the opening and closing ring 23** clockwise to "CLOSE" the stop blades.

The reference number 15 denotes an electromagnet, and 27 denotes a ratchet for the opening and closing ring, whose nose **27*a* is meshed with a ratchet wheel 25*a*, which is the final mechanism of the group of gears 25, and the other end 27*b* cooperates with the electromagnet 15**, said end being an extension of the armature during excitation.

The stop drive lever 29 is resiliently coupled with the stop swing lever 28 by means of a spring 33 more powerful than the spring 26. Prior to releasing the shutter, a pawl **30*a* of a stop plate 30 engages one end of the stop drive lever 29*a* to thereby stop the movement of the stop drive lever. The swing lever 28 has a pin 28*d* whose surface is covered with an insulator material, fixedly mounted on the other end 28*c* thereof so as to actuate reset switch 12 for condenser 11, whereas driver lever 29 has a pin 29*c*, also covered with an insulator material, fixedly mounted thereon, so as to actuate a memory switch 4**.

When a release plate 32 is manually actuated in a direction as indicated by the arrow in the figure, an arm **32*a* thereof presses a pin 30*b* on the stop lever 30 to rotate said lever 30 clockwise disengaging the stop drive lever 29. The drive lever 29 is thereby allowed to rotate counterclockwise under the influence of spring 34 to open the memory switch 4. Thereafter, a pin 29*b* presses a cam surface 28*b* of the swing lever 28 to thereby rotate the swing lever 23 counterclockwise. Initially, the pin 29*b* is suitably kept apart from the cam surface 28*c* for the purpose of timing the opening of the switch 4** during that period.

As soon as the swing lever 28 commences rotation, the reset switch 12 is opened to initiate operation in the circuit as previously described. The stop opening and closing ring 23 and the gear portion **23*b* begin rotating clockwise by means of the spring 26, and the ratchet wheel 25*a* of the gears 25** rotates counterclockwise. After a lapse of time *t*, when the amplifier 14 switches, the electromagnet 15 is de-energized and the ratchet wheel **25*a* is stopped by the engagement of nose 27*a* through the action of spring 35 thus stopping the rotation of ring 23**, and fixing the stop or aperture value.

While not shown in the drawing, it should be noted that the drive lever 29 and the ratchet 27 after actuation may be reset to the position in FIG. 2 when the film is wound or may be of the quick return type.

While the memory switch 4 has been opened by the stop drive lever 29 in the aforementioned embodiment, it may also be opened and closed by the release plate 32 because the switch only needs to be allowed to operate shortly before actuation of the stop blade 21 (or the upward movement of a mirror, in the case of a camera with a mirror).

Further, time lag of the electromagnet 15 (time from switching of the amplifier 14 to disengagement of the armature **27*b***), and the actuation delay of the mechanisms may be electrically controlled.

As is apparent from the foregoing, the iris value Av and time *t* (time from opening of the reset switch 12 to switching of the amplifier 14) are in linear relation so that the time to adjust the aperture is dramatically reduced.

An improvement of the basic invention is illustrated in the circuit diagram of FIG. 3 wherein the same reference numerals as used in FIG. 1 designate identical circuit elements. More specifically, the capacitor 5 and the memory switch 4 have been eliminated. This is possible due to the speed of operation of the device which permits the stop determining member to be operated before the mirror and the stop blades move.

Figure 4:
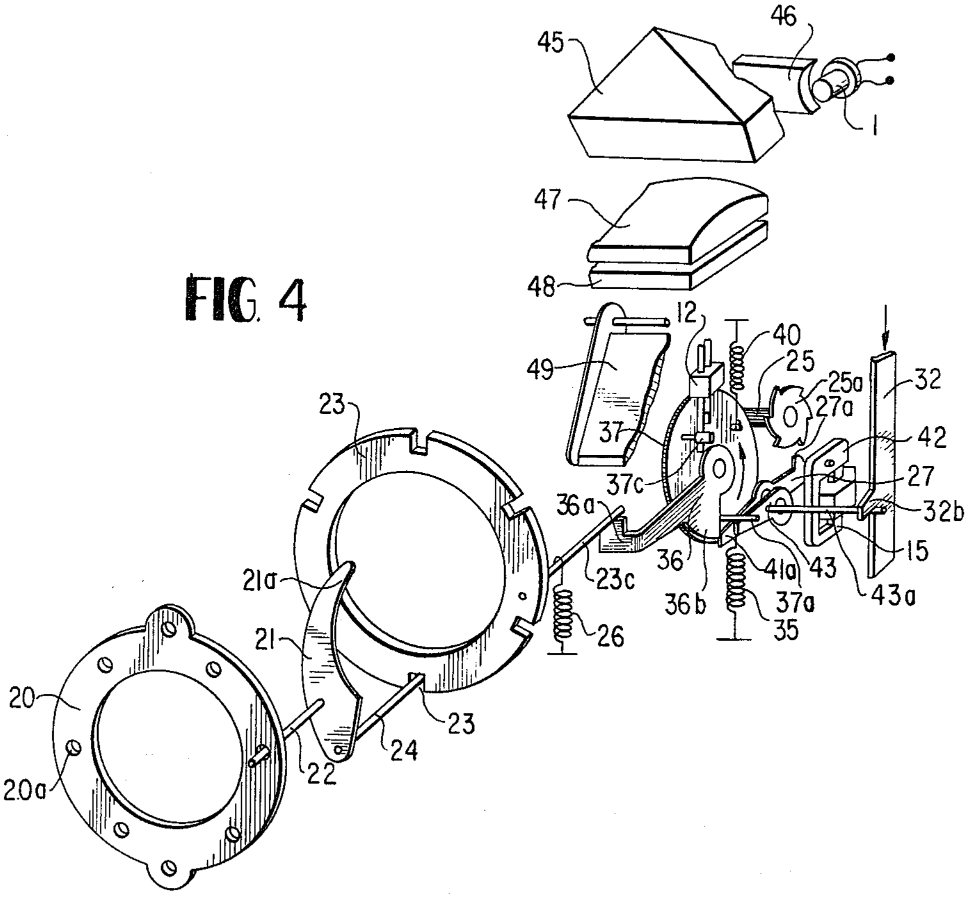
FIG. 4 is a view showing another mechanism of the device in accordance with the invention.

FIG. 4 shows another mechanism of the device in accordance with the present invention. In this figure, the same reference numerals are used as in FIG. 2 to designate identical or corresponding parts.

The reference numeral 20 indicates a support ring of stop blade 21 and is fixed to a lensmount (not shown). A shaft 22 of the stop blade 21 is rotatably supported in a hole **20*a*. Another pin 24 of the stop blade 21 is engaged with a notch 23*a* of a stop operating ring 23 so that the stop blade 21 may be rotated clockwise about the shaft 22 by the clockwise rotation of the operating ring 23 to stop down the stop. The operating ring 23 is provided with a rod 23*c* fixed thereto and extending to the camera body to be engaged with the top end 36*a* of the stop stopping lever 36 so that an engaging portion 36*b* of the stopping lever 36 is hooked by a tip end 41*a* of an engaging lever 41 overcoming the spring force of a spring 23*d* acting clockwise of the ring 23. A stop determining member 37 is provided with teeth on the outer periphery thereof, and a pin 37*a* fixed thereto is set by an engaging lever 43 overcoming the force of a spring 40. The pin 37*a* is also engaged with an engaging portion 36*b* of the stopping lever 36. The stop determining member 37 is provided with a pin 37*c* covered with insulating material and closes reset switch 12 in the circuit. The teeth of the stop determining member 37 are meshed with a speed control gear mechanism 25 so as to be rotated at a proper speed, and a ratchet wheel 25 at the final step thereof is engaged with a hook 27*a* of the engaging lever 27. Further, the engaging lever 27 is provided with an armature 42 with a proper play which is attracted by a magnet 15 in the circuit overcoming the force of the spring 41*c*.**

On the engaging lever 43 is fixed a pin **43*a* the end of which is engaged with a projected part 32*b* of a release plate 32**.

The operation will now be described. When the shutter release plate 32 is moved in the direction (downward) indicated by an arrow by an external operation, the projected part 32*b* depresses the pin 43*a* causing the engaging lever 43 to be rotated counterclockwise. The lever 43 is disengaged from the pin 37*a* to permit rotation of the stop determining member 37 in the counterclockwise direction. The speed control gear mechanism 25 also rotates because of the meshed teeth with member 37. Since the reset switch 12 is opened simultaneously, the operation by the circuit of FIG. 3 starts. After a time determined by the brightness, film speed, and shutter speed, as explained above, the output of amplifier 14 switches causing magnet 15 to de-energize. Then, the armature 42, which has been attracted by the magnet, is released, and accordingly, the engaging lever 27 is rotated counterclockwise by the spring 35 and the stopping lever 36 is released. Simultaneously, the hook portion 27*a* thereof falls into engagement with the ratchet wheel 25*a* and the stop determining member 37 is stopped.

The stopping lever 36 thereafter moves together with the stop operating ring 23 by means of a spring 26. The termination of the movement is a point where the engaging portion 36*b* thereof abuts the pin 37*a* on the stop determining member 37. At this point, the stop is stopped down.

In other words, the camera operates in accordance with the following sequence.

(1) The stop determining member 37 starts to move by release operation.

(2) The time constant circuit starts to operate by opening the reset switch 12.

(3) When the time operated by the circuit has lapsed, the magnet 15 is de-energized.

(4) The stop determining member 37 is stopped. Substantially simultaneously, the stop lever 36, the operating ring 23, and the stop blades 21 (only one illustrated) begin moving to stop down the stop mechanism.

(5) When edge 36*b* reaches pin 37*a*, the latter mechanisms cease movement.

(6) The mirror 49 then swings out of position by a known mechanism.

(7) The shutter starts to open.

In FIG. 4, the reference numeral 45 indicates a penta prism, 46 indicates an eyepiece, 47 indicates a condenser lens and 48 indicates a focusing plate.

The present invention results in the following advantages.

(1) The delay in the camera operation is reduced since an electromagnet is employed instead of a meter or motor as an electrical-to-mechanical transducer, and the electromagnet is controlled by a time which corresponds linearly to the stop size, APEX operated, based on the scene brightness, shutter speed and film sensitivity.

(2) The structure and space occupied are improved since a stop driving member is clamped by a member interlocked with an armature of an electromagnet.

(3) In the improvement on the basic invention, the stop is controlled without memorizing the scene brightness, and as a result, a switched capacitor for memorization is not necessary and the leakage of charge or degradation of humidity resistance caused by use of the switched capacitor is reduced.

(4) The delay in the camera operation is reduced since the engagement of the stop determining member is released and the stop down operation of the stop blades is started simultaneously therewith by the movement of the shutter release plate.

What is claimed is:

1. An automatic exposure mechanism for a single lens reflex camera of the type having stop blades for controlling the stop position of the camera, a brightness measuring element, film and shutter speed setting mechanisms, and a shutter release button for initiating picture taking operation, said automatic exposure mechanism comprising:

(a) an electromagnet, (b) electronic circuit means for controlling said electromagnet in response to brightness of a scene to be photographed, and film speed and shutter speed settings, to alter the energization condition of said electromagnet at a time following depression of the camera shutter release button dependent upon the circuit — determined stop position of said camera's stop blades, said circuit performing a timing operation which is linearly proportional to the number of stop positions required for proper exposure, (c) stop determining means biased to move in a predetermined direction when free to move, said means being linked to said stop blades whereby the position of said stop determining means determines the position of said stop blades, (d) an engaging lever positioned in a normal position to prevent free movement of said stop determining means, said engaging lever being linked to said shutter release button to move away from its normal position to no longer prevent free movement of said stop determining means, (e) magnetically controlled means responsive to said electromagnet for moving from a first position to a second position in response to said change of energization of said electromagnet, said first position permitting free movement of said stop determining means and said second position preventing free movement of said stop determining means, whereby the depression of said shutter button starts said circuit timing operation and permits free movement of said stop determining means and at the end of said time said stop determining means ceases movement and said stop blades move to a position determined by said stop determining means, wherein said electronic circuit means comprises:

(i) photosensor means responsive to the scene brightness, (ii) first log compression means connected in series with said photosensor means, (iii) variable resistance means adjustable according to shutter speed and film speed, (iv) second log compression means connected in series with said variable resistance means, (v) timing means, including a capacitor and a constant current generator connected to said capacitor, connected to the junction of said variable resistance means and said second log compression means, and (vi) switching means connected to the junction of said photosensor means and said first log compression means and also connected to said timing means for generating a switching signal when the output of said timing means exceeds the output at said junction of said photosensor means and said first log compression means, the time of switching *t* being a function of the APEX stop size $A_v$ according to the following formula:

$t = K_3 (K_0 + A_v)$, where $K_0$ and $K_3$ are constants of proportionality.

2. An automatic exposure mechanism for a single lens reflex camera as recited in claim 1, wherein said stop blades move with said stop determining means.

3. An automatic exposure mechanism for a single lens reflex camera as recited in claim 2, wherein said electronic circuit includes means for memorizing the scene brightness at the moment said shutter release button is actuated.

4. An automatic exposure mechanism for single lens reflex camera as claimed in claim 3 wherein said means for memorizing comprises, a storage capacitor and a normally closed switch connected in series, said series connection being connected in parallel with said first log compression means, and wherein said mechanism further comprises, release means associated with said stop determining means to open said switch when said stop engaging means moves away from its normal position.

5. An automatic exposure mechanism for a single lens reflex camera as recited in claim 1, wherein said magnetically controlled means in said first position prevents free movement of said stop blades and in said second position permits free movement of said stop blades.

6. An automatic exposure mechanism for a single lens reflex camera as claimed in claim 5, further comprising, linkage means linked to said stop blades to prevent rotation thereof when held in a first position and to permit rotation thereof when said linkage means is released from said first position and permitted to rotate, said linkage means being held in said first position by said magnetically controlled means when the latter is in its first position, and being held by a stopping means on said stop determining means at a position which depends upon the position of said stop determining means, whereby said linkage means and said stop blades rotate after said stop determining means ceases rotation and continues to rotate to a position controlled by said stop determining means.

* * * * *